US008226290B1

(12) United States Patent
Tolufashe

(10) Patent No.: US 8,226,290 B1
(45) Date of Patent: Jul. 24, 2012

(54) COMBINED COOKING AND MASHING DEVICE

(76) Inventor: Eunice K. Tolufashe, Micham-Surrey (GB)

( * ) Notice: Subject to any disclaimer, the term of this patent is extended or adjusted under 35 U.S.C. 154(b) by 478 days.

(21) Appl. No.: 12/604,225

(22) Filed: Oct. 22, 2009

(51) Int. Cl.
*A47J 43/04* (2006.01)
*A47J 43/06* (2006.01)

(52) U.S. Cl. ..... 366/146; 366/144; 366/206; 219/460.1; 219/432; 219/436; 219/520; 219/201; 99/348

(58) Field of Classification Search ............ 366/144, 366/146; 219/201, 432, 436, 460.1, 520; 99/348
See application file for complete search history.

(56) References Cited

U.S. PATENT DOCUMENTS

| | | | | |
|---|---|---|---|---|
| 1,882,127 A | * | 10/1932 | Emmons | 366/199 |
| 2,275,901 A | * | 3/1942 | Harwood | 219/201 |
| 2,648,514 A | * | 8/1953 | Rosier et al. | 248/131 |
| 2,789,798 A | * | 4/1957 | Brace | 366/199 |
| 3,224,743 A | * | 12/1965 | Freedman et al. | 366/200 |
| 3,761,668 A | * | 9/1973 | Harnden et al. | 219/622 |
| 4,125,065 A | | 11/1978 | Lee | |
| D254,161 S | | 2/1980 | Verdun | |
| 4,387,860 A | | 6/1983 | Necas et al. | |
| 4,649,810 A | * | 3/1987 | Wong | 99/326 |
| D300,799 S | | 4/1989 | Viancin | |
| 5,525,781 A | * | 6/1996 | Yahav et al. | 219/620 |
| 5,845,991 A | | 12/1998 | Sundquist | |
| 6,397,735 B1 | | 6/2002 | Wong | |
| 6,786,141 B2 | | 9/2004 | Tompa et al. | |
| 7,080,594 B2 | | 7/2006 | Lin | |
| 2006/0044935 A1 | * | 3/2006 | Benelli et al. | 366/145 |

* cited by examiner

*Primary Examiner* — Henry Yuen
*Assistant Examiner* — Jianying Atkisson

(57) ABSTRACT

A cooking and mashing device for cooking and mashing a food in a bowl comprising a generally flat cooking panel; a hot plate component disposed on the top surface of the cooking panel; a motor housing disposed on the top surface of the cooking panel; an arm pivotally attached to the top surface of the motor housing via a pivot component, wherein the arm can move between an up position and a down position; a plurality of mashing blades attached to the second end of the arm; a first motor for driving the mashing blades to rotate; and a drain for draining excess water that accumulates atop the hot plate component.

6 Claims, 2 Drawing Sheets

US 8,226,290 B1

COMBINED COOKING AND MASHING DEVICE

FIELD OF THE INVENTION

The present invention is directed to a small en appliance. More particularly, the present invention is directed to a device for cooking and/or mashing food such as yams, sweet potatoes, plantains, and/or the like.

BACKGROUND OF THE INVENTION

Cooking and mashing foods such as yams, sweet potatoes, and plantains can be very time consuming. The present invention features a cooking and mashing device that can be used for both cooking and mashing such foods. Without wishing to limit the present invention to any theory or mechanism, it is believed that the device of the present invention is advantage use it can help a user save time and energy.

Any feature or combination of features described herein are included in the scope of the present invention provided that the features included in any such combination are not mutually inconsistent as will be apparent from the context, this specification, and the knowledge of one of ordinary skill in the art. Additional advantages and aspect of the present invention are apparent in the following detailed description and claims.

DESCRIPTION OF PREFERRED EMBODIMENTS

Figure 1:
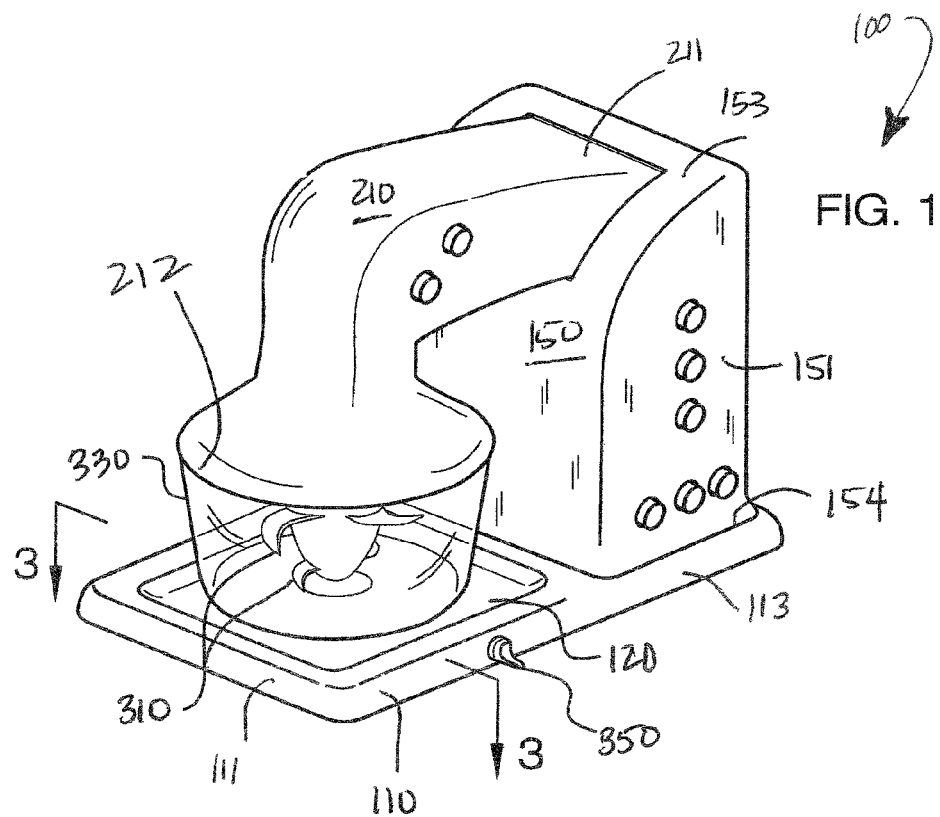
FIG. 1 is a perspective view of the cooking and mashing device of the present invention.
Figure 2:
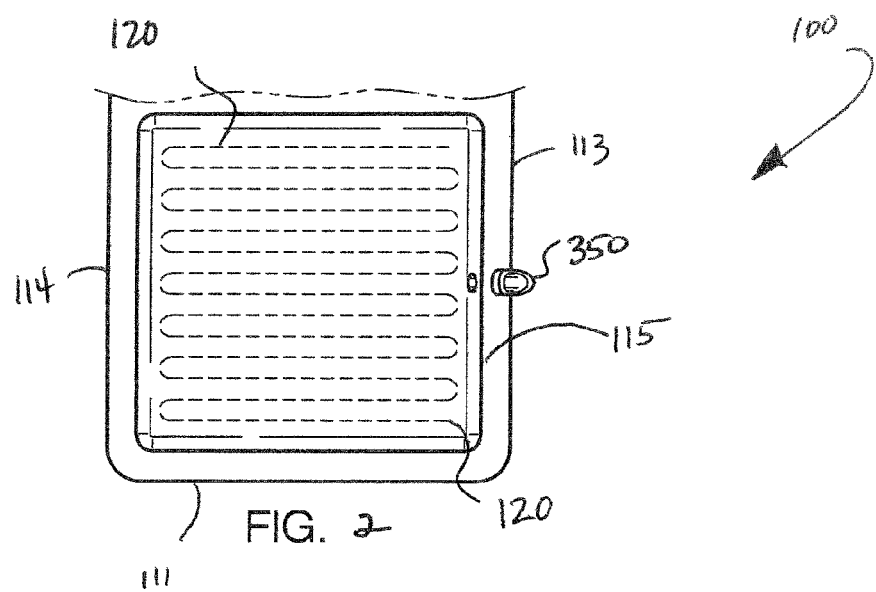
FIG. 2 is a top view of cooking and mashing device of the present invention.
Figure 3:
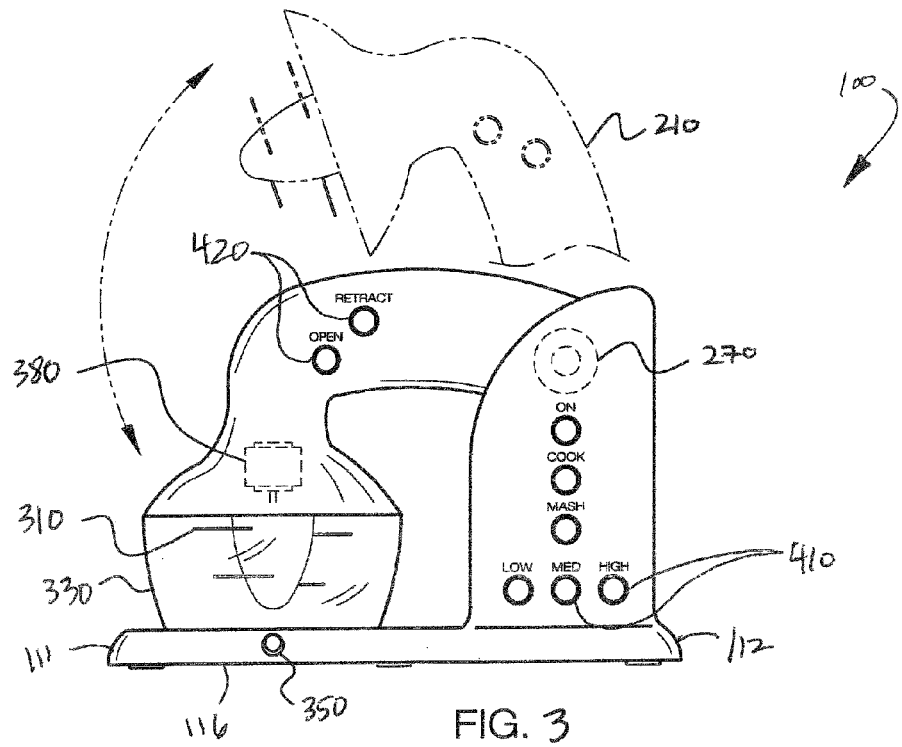
FIG. 3 is a side view of the cooking and mashing device of the present invention.
Figure 4:
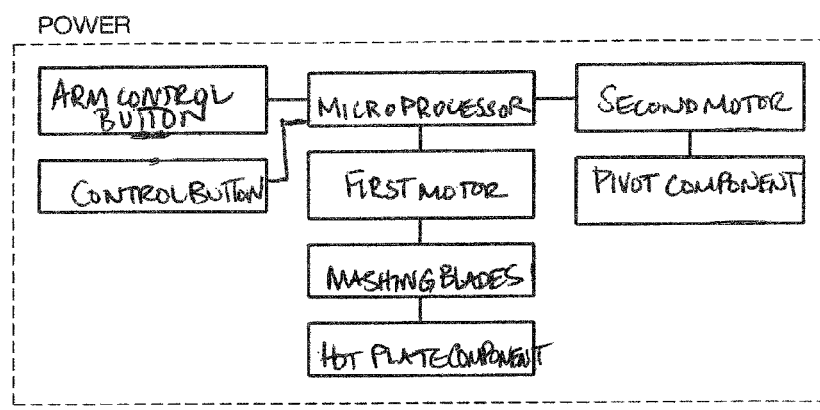
FIG. 4 is a schematic representation of the electrical components of the cooking and mashing device of the present invention.

The following is a listing of numbers corresponding to a particular element refer to herein:
- 100 cooking and mashing device
- 110 cooking panel
- 111 first side of cooking panel
- 112 second side of cooking panel
- 113 third side of cooking panel
- 114 fourth side of cooking panel
- 115 top surface of cooking panel
- 116 bottom surface of cooking panel
- 120 hot plate
- 150 motor housing
- 151 first side of motor housing
- 152 second side of motor housing
- 153 top surface of motor housing
- 154 bottom surface of motor housing
- 210 arm
- 211 first end of arm
- 212 second end of arm
- 270 pivot component
- 310 mashing blade
- 330 bowl
- 350 drain
- 380; first motor
- 410 speed control button
- 420 arm control button Referring now to FIGS. 1-4, the present invention features a cooking and mashing device 100 for food such as yams, sweet potatoes, plantains, the like, or a combination thereof. The cooking and mashing device 100 of the present invention comprises a generally flat cooking panel 110 having a top surface 115, a bottom surface 116, a first side 111, a second side 112, a third side 113, and a fourth side 114. Disposed on the top surface 115 of the cooking panel 110 near the first side 111 is a hot plate component 120 for cooking the food. A bowl 330 for containing food can be placed atop the hot plate component 120. The hot plate component 120 is operatively/electrically connected to a power source.

Attached to the top surface 115 of the cooking panel 110 near the second side 112 is a motor housing 150 having a first side 151, a second side 152, a top surface 153, and a bottom surface 154. An arm 210 is pivotally attached to the top surface 153 of the motor housing 150 via a pivot component 270. The arm 210 can pivot between an up position and a down position. In some embodiments, a user can manually move the arm 210.

The arm 210 has a first end 211, a second end 212, a first side, and a second side. The first end 211 is pivotally attached to the top surface 153 of the motor housing 150. The second end is oriented near the cooking panel 110 (e.g., the top surface 153). A plurality of mashing blades 310 is attached to the second end 212 of the arm 210. The arm 210 can be moved to the down position such that the mashing blades 310 enter into the bowl 330 on the hot plate component 120.

A first motor 380 is disposed in the arm 210 near the second end 212. The first motor 380 drives the movement of the mashing blades 310. The first motor 380 is operatively/electrically connected to a power supply (e.g., battery, electrical outlet). The mashing blades 310 are operatively connected to the first motor 380. When the first motor 380 is activated, the mashing blades 310 are spun in a first direction or a second direction to mash/puree the food.

In some embodiments, the device 100 of the present invention further comprises a microprocessor. The microprocessor is operatively connected to the first motor 380 and to a control button 410. The microprocessor is configured to receive a first input from the control button 410 and generate a first output command to the motor 380 for activating the first motor 380 to rotate the mashing blades 310. In some embodiments, the control button 410 is disposed on the first side 150 and/or second side of the motor housing 150. The control button 410 may be for changing the speed at which the mashing blades 310 rotate.

In some embodiments, the mashing blades 310 mechanically retract (e.g., automatically) when the arm 210 is moved to the up position. Retracting the mashing blades 310 in this manner can help prevent a user from injuring himself on the mashing blades 310.

In some embodiments, a second motor is disposed in the motor housing 150. The second motor may move the arm 210 between the up position and the down position, for example the second motor may control the pivot component that allows the arm 210 to move from the up position and the down position. In some embodiments, the microprocessor is operatively connected to the second motor and to an arm control button 420. In some embodiments, the microprocessor is configured to receive a second input from the arm control button 420 and generate a second output command to the second motor for moving the arm 210.

In some embodiments, the hot plate component 120, the first motor, the second motor, and/or the microprocessor may be operatively connected to a power source.

In some embodiments, the cooking and mashing device 100 of the present invention further comprises a drain 350 serving as a conduit through the hot plate component 120 and the cooking panel 110. In some embodiments, the drain 350 is attached to the first side 111 of the cooking panel 110. The drain 350 is for draining excess water that accumulates after cooking the food (e.g., before mashing). The drain 350 can remove any liquid that collects atop the hot plate component 120.

To use the cooking and mashing device 100, a user can place a food (e.g., yams, sweet potatoes, plantains) into the bowl 330. He/she can then activate the hot plate component 120 and cook the food for a particular length of time. After the food has been cooked appropriately, the user can drain any excess water from inside the bowl 330 via the drain 350. Next, the user can activate the mashing blades 310 such that they rotate and mash the food in the bowl 330. In some embodiments, the cooking and mashing device 100 of the present invention cooks and/or mashes the into a sticky paste.

In some embodiments, a power cord allows a user to connect the cooking and mashing device 100 to a power source such as an electrical outlet.

The cooking and mashing device 100 may be used to cook and/or mash any type of root (e.g., yams, sweet potatoes). In some embodiments, the cooking and mashing device 100 can be used with any other food, such as flour.

The cooking and mashing device 100 of the present invention may be constructed from a variety of materials. For example, in some embodiments, the cooking and mashing device 100 may be constructed from a material comprising a metal, a plastic, the like, or a combination thereof. In some embodiments, the cooking and mashing device 100 can be constructed in various colors and/or shapes (e.g., square, oblong), and/or styles.

The cooking and mashing device 100 of the present invention may be constructed in a variety of sizes. In some embodiments, the cooking and mashing device 100 is between about 50 to 60 centimeters long as measured from the first side 111 of the cooking panel 110 to the second side 112 of the cooking panel 110. In some embodiments, the cooking and mashing device 100 is between about 60 to 70 centimeters long as measured from the first side 111 of the king panel 110 to the second side 112 of the cooking panel 110. In some embodiments, the cooking and mashing device 100 is more than about 70 centimeters long.

As used herein, the term "about" refers to plus or minus 10% of the referenced number. For example, an embodiment wherein the cooking and mashing device 100 is about 50 centimeters long includes a device 100 that is between 45 and 55 centimeters long.

The following the disclosures of the following U.S. patents are incorporated in their entirety by reference herein: U.S. Pat. No. 7,080,594; U.S. Pat. No. 6,397,735; U.S. Pat. No. 5,845,991; U.S. Pat. No. 4,387,860; U.S. Pat. No. 6,786,141; U.S. Pat. No. 4,125,065.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described present embodiment of the present invention, it will be readily apparent to those skilled in the art that modifications may be made thereto which do not ex the scope of the appended claims. Therefore, the scope of the invention is only to be limited by the following claims.

What is claimed is:

1. A cooking and mashing device for cooking and mashing a root in a bowl, said cooking and mashing device comprising:
    (a) a generally flat cooking panel;
    (b) a hot plate component disposed on a top surface of the cooking panel near a first side, the hot plate component being for cooking the root in the bowl when the bowl is placed on the hot plate component;
    (c) a housing disposed on the top king panel near a second side;
    (d) an arm having a first and a second end, the first end being pivotally attached to a top surface of the housing via a pivot component; wherein the arm can pivot between an up position and a down position; wherein in the up position the second end of the arm is raised above the housing and in the down position the second end of the arm is lowered into the bowl on the hot plate component;
    (e) a plurality of mashing blades attached to the second end of the arm, the mashing blades being operatively connected to a first motor that can drive the mashing blades to rotate;
    (f) a second motor disposed in the housing and operatively connected to the pivot component wherein the second motor moves the pivot component to move the arm between the up position and the down position;
    (g) a microprocessor operatively connected to the first motor, the second motor, a control n, and an arm control button, wherein the microprocessor is configured to:
        (i) receive a first input from the control button whereupon the microprocessor generates a first output signal to the first motor for activating the first motor to rotate the mashing blades; and
        (ii) receive a second input from the arm control button whereupon the microprocessor generates a second output signal to the second motor to move the arm between the up position and the down position;
    (h) a drain disposed in the cooking panel serving as a conduit through the hot plate component and the cooking panel, wherein the drain is for draining excess water that accumulates atop the hot plate component and
    (i) a power source operatively connected to the first motor and to the second motor.

2. The cooking and mashing device of claim 1, rein the root includes a yam, a sweet potato, a plantain, the like, or a combination thereof.

3. The cooking and mashing device of claim 1, wherein the mashing blades retract into the second end of the arm when the arm is moved to the up position.

4. The king and mashing device of claim 1, wherein the control button can change a speed at which the mashing blades rotate.

5. The cooking and mashing device of claim 4, rein the control button is disposed on the first side or the second side of the motor housing.

6. The cooking and mashing device of claim 1, wherein a power cord connects the cooking and mashing device to an electrical outlet.

* * * * *